United States Patent [19]

Davis

[11] Patent Number: 5,261,275

[45] Date of Patent: Nov. 16, 1993

[54] WATER METER SYSTEM

[76] Inventor: Robert J. Davis, 11110 Gopher Mine Trail, Grass Valley, Calif. 95949

[21] Appl. No.: 758,582

[22] Filed: Sep. 12, 1991

[51] Int. Cl.$^5$ .............................................. G01F 3/12
[52] U.S. Cl. ....................................... 73/258; 73/253; 73/861.77
[58] Field of Search ...................... 73/257, 258, 861.77, 73/253; 418/50, 53

[56] References Cited

U.S. PATENT DOCUMENTS

| Re. 28,000 | 4/1974 | Branitzky | 73/258 |
|---|---|---|---|
| 375,023 | 12/1887 | Thomson et al. | 73/258 |
| 486,992 | 11/1892 | Tilden | 73/258 |
| 514,171 | 2/1894 | Thomson | 73/258 |
| 527,539 | 10/1894 | Nash | 418/53 |
| 534,749 | 2/1895 | Kelley | 418/50 |
| 2,294,825 | 9/1942 | Bassett | 73/258 |
| 2,921,468 | 1/1960 | Treff et al. | 73/258 |
| 3,442,126 | 5/1969 | Southall | 73/257 |
| 4,229,150 | 10/1980 | Teague et al. | 418/53 |
| 4,232,550 | 11/1980 | Aigner | 73/258 |
| 4,848,164 | 7/1989 | Quarve et al. | 73/861.77 |
| 5,125,809 | 6/1992 | Hartley et al. | 418/53 |

Primary Examiner—Herbert Goldstein
Assistant Examiner—R. Biegel
Attorney, Agent, or Firm—Bernhard Kreten

[57] ABSTRACT

A device which monitors the through passage of incompressible fluids such as water that relies upon a nutating disk-type transducer associated with a spherical hollow core. The disk includes a spindle which precesses in the presence of a sensor. A display panel is driven by a microcontroller which converts the precession of the spindle to useful output as a function of time whereby the precession correlates with volume flow through the nutating disk transducer.

19 Claims, 4 Drawing Sheets

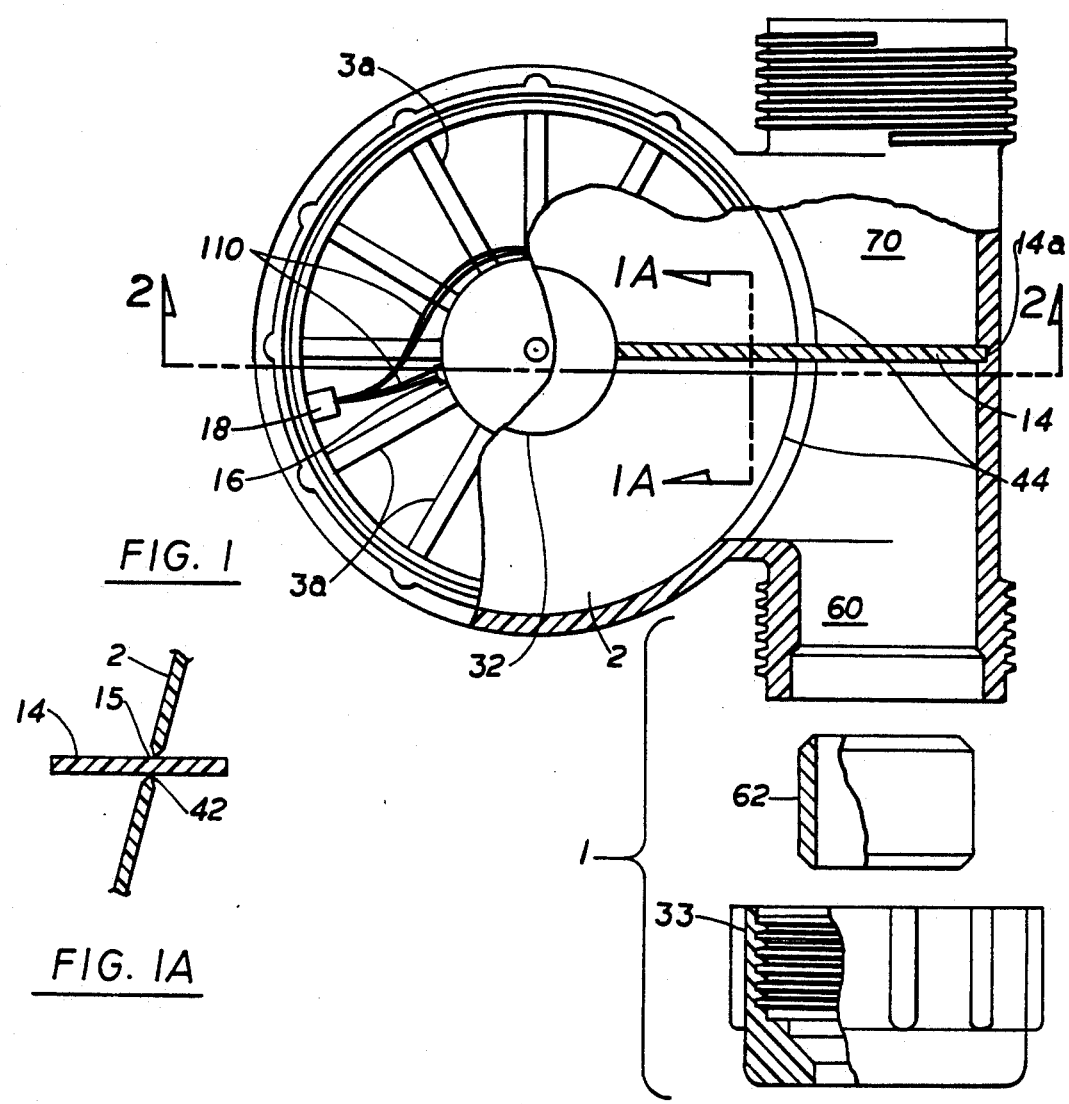
FIG. 1
FIG. 1A
FIG. 3
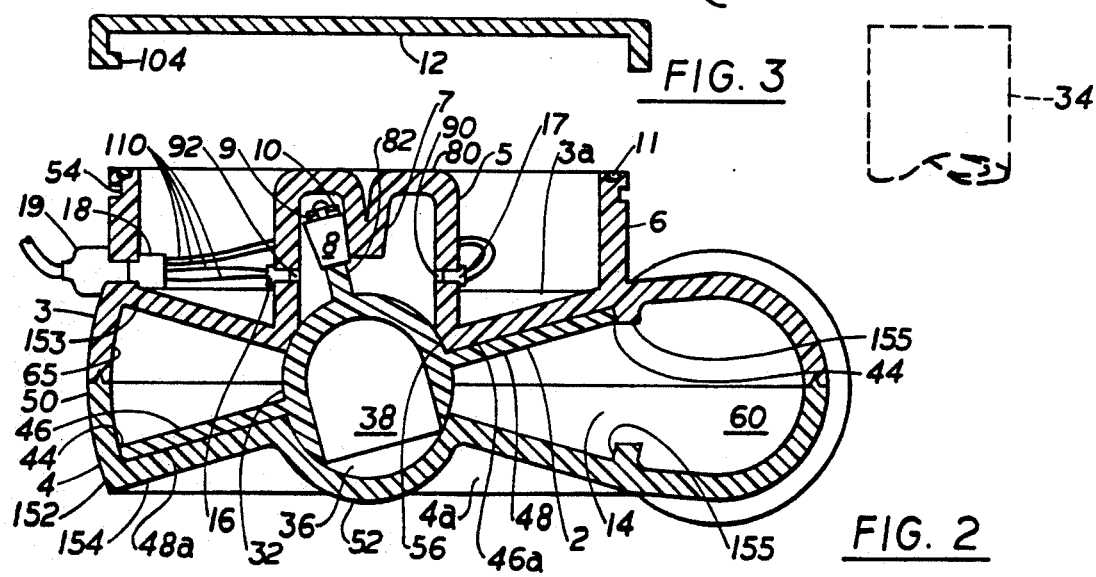
FIG. 2

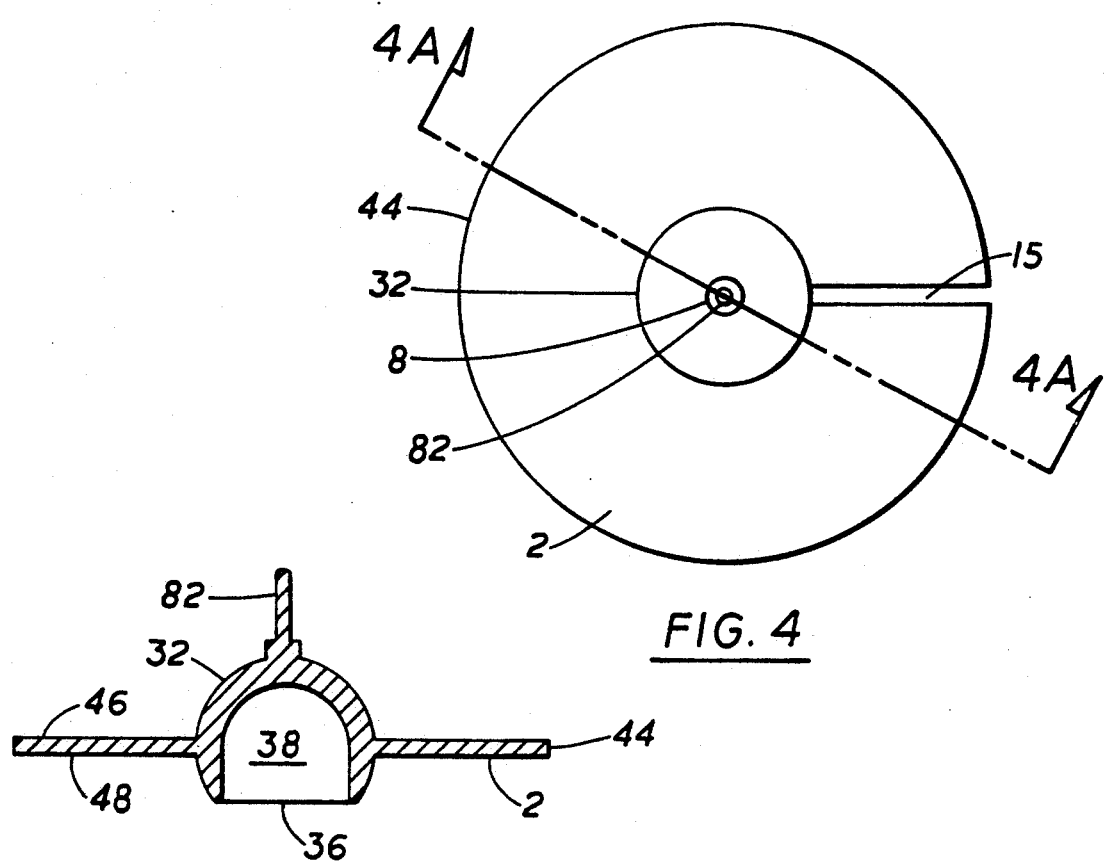
FIG. 4
FIG. 4A
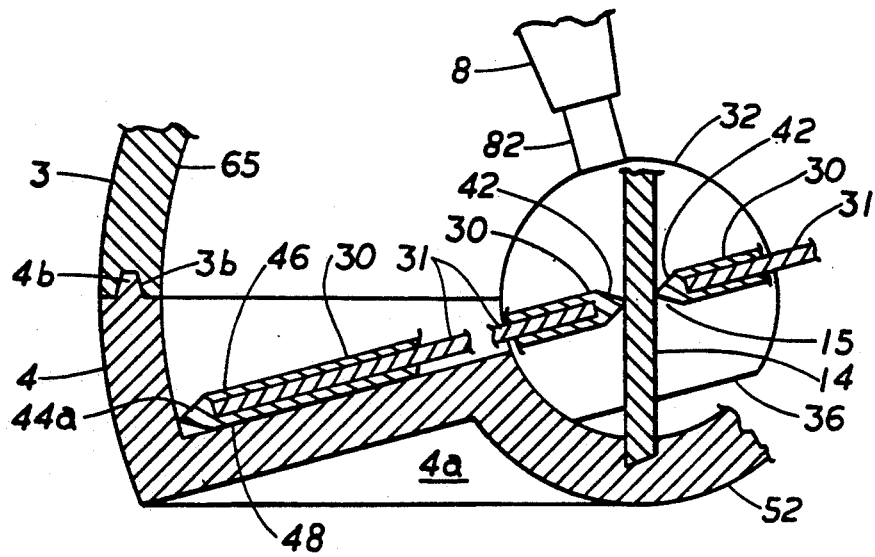
FIG. 5

WATER METER SYSTEM

FIELD OF THE INVENTION

This invention relates to devices for measuring the flow of liquids through a conduit utilizing a nutating disk which oscillates in proportion to the amount of fluid passing therethrough. More particularly, this meter utilizes lightweight materials and is of a lightweight construction. The meter has an incorporated electronic readout having various functions incorporated therein for monitoring of fluid use habits by users within a residence or a business.

BACKGROUND OF THE INVENTION

Liquid flow meters utilizing nutating disks have long existed in the prior art. These devices have used various means to transmit the oscillating input to an output readable by the user. These devices have been designed with the industrial user in mind as opposed to residential or commercial users. Many of these prior art devices are not easily connectable to common household plumbing and are of a size and shape which makes their use in the residential or commercial setting impractical.

Certain areas of this country, especially the West, have recognized the problems associated with water conservation. In fact, certain municipalities which heretofore have not required the use of water meters are now so requiring at least in new residences and it is readily foreseeable that the installation of such meters in all residences will become mandatory. More importantly, residences already provided with water meters are now subject to scrutiny with respect to consumption characteristics which, if excessive, will cause municipalities to put restrictive-use devices in the conduit leading to excessive users to curb profligate water use.

This invention, while utilizing some similar components as those existing in the prior art, measures the flow of liquids in a new and useful manner more appropriately suited to the residential or commercial user. Lightweight materials are used and a simplified structure is employed with simple interconnections of standard sizes and shapes.

The following patents reflect the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter.

| INVENTOR | PATENT NO. | ISSUE DATE |
| --- | --- | --- |
| Thomson, et al. | 375,023 | December 20, 1887 |
| Tilden | 486,992 | November 29, 1892 |
| Thomson | 514,171 | February 6, 1894 |
| Treff, et al. | 2,921,468 | January 19, 1960 |
| Southall | 3,442,126 | May 6, 1969 |
| Branitzky | Re 28,000 | April 30, 1974 |
| Aigner | 4,232,550 | November 11, 1980 |

The patent to Thomson teaches a water flow meter whose chamber is along side the conduit being measured. Also, a bowl-shaped nutating disk is utilized to measure liquid flow. The device of this invention is distinguishable from Thomson in that the nutating disk of this invention is a flat disc rather than a bowl-shaped disk. Furthermore, the device of this invention utilizes a photo-optical transducer to measure oscillation of the nutating disk.

The invention to Southall teaches, in one embodiment, a nutating disk to measure fluid flow. The nutating disk in Southall is oriented such that the disk axis (which is perpendicular to the disk) is parallel with the direction of liquid inlet and liquid outlet. The device of this invention is distinguishable in that the disk axis is perpendicular to the nutating disk and also is perpendicular to the inlet and outlet of the liquid being measured. Also, the Southall patent discloses the use of a magnetic sensor to measure disk oscillation, whereas the device of this invention uses a photo-optical device.

The patent to Tilden teaches a liquid flow meter utilizing a nutating disk which has a tapering cross-section. The Tilden device is shaped for utilization within a substantially cylindrical chamber. The device of this invention utilizes a flat nutating disk within a housing having a greater thickness at extremities than at the center of the nutating disk. Furthermore, the device of this invention utilizes a photo-optical sensor to register oscillation of the nutating disk as opposed to a mechanical linkage as disclosed in Tilden.

The patent to Treff discloses a liquid meter utilizing a nutating disk which has a magnetic sensor connected to a meter display having a plurality of dials connected to gears. The device of this invention is distinguishable from Treff in that it utilizes an electric readout device. An electric readout provides greater flexibility to the user of the meter in recording fluid flow over a period of time. Also, the present invention is of a simple lightweight construction more easily utilizable in a residential or commercial environment.

The patent to Aigner is of interest in that it discloses (in an alternative embodiment) the use of an infrared diode and a photo-transistor for recording the oscillation of a nutating disk incorporated therein. The Aigner patent utilizes a nutating disk which fits frictionally within a housing without any roller bearings on any surfaces. The device of this invention is distinguishable from Aigner in that a meter is provided for displaying the measurements of the device in a variety of useful ways and also has a nutating disk supported on some surfaces with roller bearings and on other surfaces with materials allowing smooth sliding of the nutating disk thereagainst.

The remainder of the prior art cited above but not specifically distinguished diverge more starkly from the present invention than those references cited above which were specifically distinguished. The device of this invention displays patentable novelty when compared to each of the devices in the prior art disclosed hereinabove.

It is stipulated, however, that none of these references teach singly, nor render obvious when combined in any conceivable, perceivable manner, the nexus of this invention as disclosed in greater detail hereinafter.

SUMMARY OF THE INVENTION

The instant invention is distinguished over the known prior art in a multiplicity of ways. Curiously, although some of these known prior art technologies have existed for quite some time, their incorporation in water meters especially for residential or light commercial use has not occurred. While the reasons for such absence may be the subject of some speculation, the structural differences between the instant invention and the known prior art is submitted with the expressed desiderata of tailoring a nutating-type meter for use in monitoring water usage in residential and light commercial environments.

The meter according to the instant invention includes a housing within which a disk is captured, the disk adapted to oscillate or precess in a certain specific manner as constrained by a slot formed in the disk which straddles a divider plate. The disk includes a spherical core at its center having a hollow interior and open at one extremity. At an opposite extremity, an upwardly extending spindle supports a conically-shaped bearing, fixed on the spindle which precesses with the spherical core under excitation by the through passage of fluid affecting the disk.

The spindle passes through an optical path of a transmitter and receiver, which are operatively coupled to a display which correlates the precession of the spindle and conical bearing to water usage providing an output. In essence, the nutating disk is captured within a housing having a fluid inlet and outlet which diverts the fluid adjacent the disk first by abutment against the divider plate. Various structural features attend the housing and the display to assure accuracy of the device and to provide useful information to the consumer. One facet of these various displays includes a display panel integrally formed with the disk housing which shows various parameters of fluid consumption as a function of different time increments. Another aspect contemplates providing this type of information at a remote location.

OBJECTS OF THE INVENTION

Accordingly, it is a primary object of the present invention to provide a novel and useful water metering system according to the present invention.

A further object of the present invention embodies a novel design and construction of a nutating disk-metering unit and combines these features with an electronic control and readout unit capable of storing and disseminating more information to the user than heretofore possible.

A further object of the present invention is to provide a two part transducer housing molded of glass and mineral reinforced thermoplastic polyester with a tongue-and-groove feature at the parting line to facilitate alignment during assembly of the device and to provide adequate surface area for an adhesive bonding agent and thus sealing when uniting the parts of the housing.

A further object of the present invention is to provide a device as characterized above which is relatively impervious to leakage due to construction techniques including gaskets and uniform compression of the gaskets between housing components.

A further object of the present invention is to provide a nutating disk with a spindle emanating from one portion of a spherical core which supports a conical bearing thereon for support. The spindle interrupts an optical circuit for counting. The disk is so constructed to provide minimum resistance or pressure loss as a parasitic monitor and is so configured as to minimize internal leakage through the meter.

A further object of the present invention is to provide a device as characterized above in which the nutating disk includes a slot integrally formed therein adapted to straddle a divider plate in which the slot is equipped with a bevel to minimize leakage past the slot and its associated divider plate.

A further object of the present invention is to provide a device as characterized above in which the disk is formed from a reinforced plastic to provide stiffness, stability and lightness. The spherical core associated therewith is hollow so that this device is more sensitive to liquid flow rates than the prior art by providing both reduced friction and a light mass for minimal inertia.

A further object of the present invention is to provide a device as characterized above in which an electro-optical sensor is associated therewith which is enabled by precession of the disk spindle associated with the conical bearing so that on precession of the spindle, the optical path is broken twice for each rotation of the disk thereby eliminating the need for a hole through the disk center which would otherwise bleed fluid from high to low pressure sides of the disk.

It is a further object of the present invention to provide a device as characterized above which in one form includes a flexible elastomer provided over the nutating disk portion to enhance the sealing characteristics within the metering chamber resulting from a core having a thinner and smaller diameter disk than heretofore possible, wherein the core including a spherical portion is molded from material which is extremely stiff and self-lubricating.

A further object of the present invention is to provide a device as characterized above which isolates the device from unwanted migration of fluid so that the device accurately reflects the through passage of liquids.

A further object of the present invention is to provide a device as characterized above where the display associated with the amount of fluid passing therebeyond can provide fluid flow information based on various parameters for more precisely monitoring water usage.

A further object of the present invention is to provide a device as characterized above which indicates to the consumer when a certain amount of liquid has been passed through the meter consonant with rationing requirements.

Viewed from one perspective, is an object of the present invention to provide a water meter which includes a housing having a divider plate integrally enclosed therein, the divider plate communicating with a water inlet and a water outlet to divert water into the housing. A nutating disk is supported in the housing where the disk has a spherical core and an elongated slot, radially extending outwardly from the spherical core and straddling the divider plate such that water contacts the disk causing nutation of the disk. The spherical core supports a spindle extending perpendicularly from both the core and the disk, the spindle precessing in response to water flow, and sensing means are coupled to the spindle to monitor precession of the spindle with display means coupled to the sensing means for providing an output correlative of water flow.

Viewed from a second perspective, it is an object of the present invention to provide a method for correlating water flow as a function of time the steps including initializing an instrumentality which monitors water flow, allowing water to flow through the instrumentality for a period of time, and reading the volume of water passing through the instrumentality at a later time, allowing further water to pass through the meter and reading either a grand total of water having been used or an incremental volume of water being used between monitoring periods.

Viewed from a third perspective, it is yet another object of the present invention to provide a method and apparatus for surveying the throughput of an incompressible fluid which includes routing the incompressible fluid through a meter which includes a nutating disk having a spherical central core with a hollow central portion and a slot extending radially from the spherical core on the disk and outwardly, orienting the disk within a housing so as to straddle a divider plate strategically placed within the housing in order to segment incompressible fluid flow to both an inlet branch and an outlet branch, and having a spindle which extends from the spherical core extend upwardly to a tower within which is supported a sensor which monitors precession of the spindle as a function of disk nutation and therefore precession of a central axis of the spherical core, providing a bearing surface on the spindle to support the spindle during its precession and a corresponding concave bearing surface for supporting the spherical core within the housing, and connecting the sensing instrumentality to a display.

These and other objects will be made manifest when considering the following detailed specification when taken in conjunction with the appended drawing figures.

DESCRIPTION OF THE DRAWINGS FIGURES

FIG. 1 is a top plan view, partially fragmented showing the apparatus according to the present invention in one form.

FIG. 1A is a sectional view taken along lines 1A—1A of FIG. 1.

FIG. 2 is a sectional view taken along lines 2—2 of FIG. 1.

FIG. 3 is a sectional view of an accessory associated with that which is shown in FIG. 2.

FIG. 4 is a top plan view of the nutating disk according to the present invention.

FIG. 4A is a sectional view taken along lines 4A—4A of FIG. 4.

FIG. 5 is a further detail in section of that which is shown in FIGS. 1 and 2 also exemplifying an alternative.

DESCRIPTION OF PREFERRED EMBODIMENTS

Figure 6:
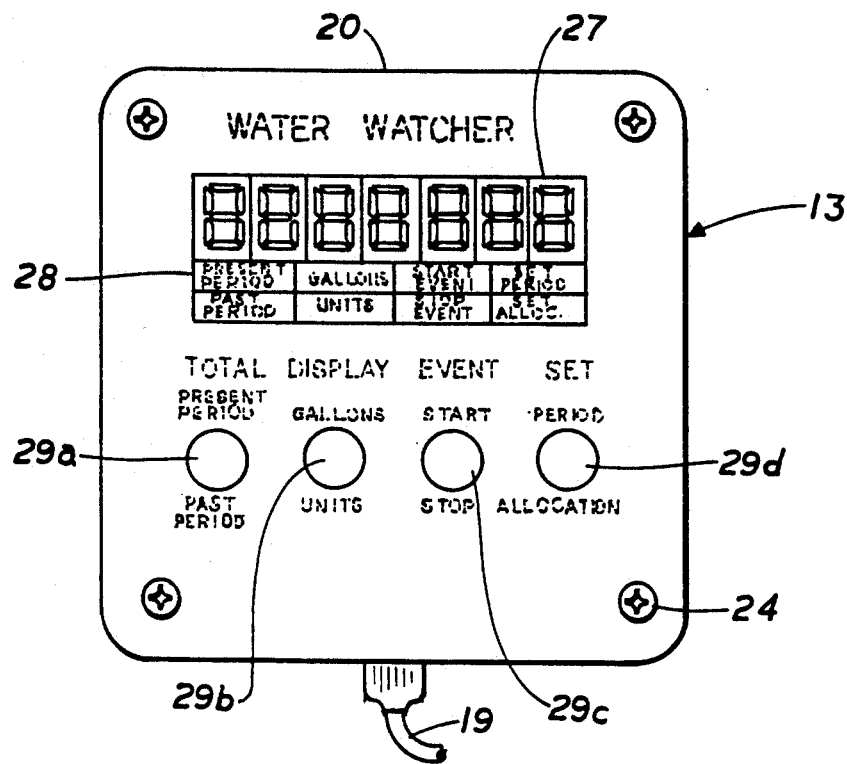
FIG. 6 is a top plan view of a display according to the instant invention.

Considering the drawings now, where like reference numerals denote like parts throughout the various drawing figures, reference numeral 1 is directed to the noncompressible fluid flow meter according to the present invention. In its essence, the noncompressible fluid flow meter 1 is intended to monitor the flow rate of a noncompressible liquid such as water therewithin, and includes a nutating disk 2 (FIG. 1) an uper housing 3 (FIG. 2) a lower housing 4 and associated structure whereby fluid flowing in an inlet 60 of the housing causes the nutating disk 2 to wobble in such a manner that a spherical core 32 integrally formed at a center of the nutating disk 2 and its associated spindle 82 precess in such a manner that an electro-optical sensor 16, 17 monitors spindle precession as a function of fluid flow rate providing an output.

More specifically, and with specific reference to FIGS. 1 and 2, various aspects of the structure according to the instant invention can be explored. In general, a housing 50 is provided with an inlet 60 and an outlet 70. A water line 34 is operatively connected to the inlet 60 of the housing 50 by means of a plastic nut 33 having internal threads complemental to external threads disposed on the housing inlet. To preclude the unwanted migration of liquid beyond the threaded area, a rubber seal 62 circumscribes a free end of the water line 34. The rubber seal 62 abuts against a shoulder provided in the housing inlet 60 and is captured by a similarly formed complemental recess contained within the interior of the plastic nut 33. Similarly, the housing outlet 70 is provided with similar structure (not shown) for directing water away from the housing 50.

Thus, water entering into the housing inlet 60 progresses through the housing and the outlet. A divider plate 14 diverts the linear flow of the water into the housing. In cross-section (e.g. FIG. 2), the housing is formed from two pieces and is somewhat "bow-tie" shape having a lower portion 4 and an upper portion 3 which are bonded together at a substantially medially disposed portion by means of a tongue 3b (of portion 3) cooperating with an associated groove 4b (of portion 4), which are formed in a periphery of the housing. See FIG. 5 for this joining detail.

Once joined, this "bow-tie" configuration collectively defines an arcuate annular band 152 which circumscribes substantially around the entire housing periphery except for where the inlet 60 and the outlet 70 are located. The annular band 152 communicates with an inwardly and downwardly declinated top wall 153 and a similarly inwardly and upwardly declinated bottom wall 154 to achieve the "bow-tie" configuration.

The bottom wall 154 converges to a central area in which a concave rest 52 is provided on the bottom wall 154. An upwardly extending annular tower 5 projects centrally from the upper wall 153. This tower 5 includes a crown 80 at a topmost portion thereof. The crown 80 terminates in a downwardly and inwardly extending race guide 7 which serves as a guide in conjunction with an interior surface of the walls defining the tower 5. A taper is provided on the race guide 7 for purposes to be assigned when considering other structure to be described hereinafter.

Note also the presence of openings in the tower wall which are diametrically opposed to one another. A first LED opening 90 and a second LED opening 92 communicate with the interior of the tower to an exterior for purposes to be assigned.

The housing 50 is further provided with sufficient structural rigidity not only by the choice of materials associated with the housing 50 but also by a plurality of radially extending stiffening ribs 3a and 4a which communicate between the central area of the housing and an outlying periphery to provide requisite rigidity. More specifically, the lower half of the housing 50 includes a plurality of radially extending ribs 4a that communicate between the concave rest 52 and the lowermost portion of the annular band 152 to strengthen the bottom wall 154 allowing thinner and lighter material to be used. Similarly, an area circumscribing the tower 5 and above the upper wall 153 includes a multiplicity of stiffening ribs 3a emanating radially outwardly and communicating adjacent the annular periphery 152 to provide similar benefits for the upper housing portion 153.

Preferably, the housing 50 is formed of glass and mineral reinforced thermoplastic polyester for lightness. The tongue-and-groove feature 3b, 4b of the housing 50 at the parting line between the upper and lower portions of the housing 50 increase the connecting surface area to provide a better adhesive bond when joining the upper and lower housing parts and to facilitate alignment which is important for accurate operation of the device.

In addition, the upper portion 3 of the housing 50 includes a cylindrical perimeter 6 concentrically circumscribing the tower 5 and overlying a major top area of the upper housing. The tower 5 resides within the cylindrical perimeter 6 and allows the openings 90, 92 free access to the perimeter 6 without worry of contamination with the environment. This allows interconnection between a plurality of connecting wires extending from the first and second LED openings 90, 92 and the ambient environment.

More specifically, first and second LED transmitters 16, 17 register with the openings 92, 90 respectively. The LED's 16, 17 include conductors 110 communicating with a plug-connector 18 or other standard means of electrical connection and an associated cable 19 made impervious to the environment through appropriate insulating technology to allow communication of the LED sensors to an environment outside the meter device 1. The cylindrical perimeter 6 is then sealed by means of a gasket 11 circumscribing a top edge of the perimeter 6 which cooperates with a cover 12 adapted to overly and occlude the interior of the cylindrical perimeter 6. In order to facilitate this sealing arrangement between the cover 12 and the cylindrical perimeter 6, a groove 54 is provided adjacent a top surface of the perimeter and carried on an upper annular outer wall of the perimeter 6. The groove 54 communicates with a lip 104 integrally formed with the cover 12. The lip 104 is substantially segmented L-shaped in configuration (in section) so that the cover 12 can turn and lock on to the cylindrical perimeter 6 in sealing engagement therewith. Note that the upper housing and lower housing portions 3, 4 combine to also form the inlet 60 and outlet 70 for economy in manufacture. Both portions of the housing 50 include an abutment stop 155 for purposes to be assigned.

The interior of the housing 50 has an inner, arcuate, annular periphery 65 complemental to the outer periphery 152. This inner periphery 65 allows the nutating disk 2 to wobble within the environs of the housing in a secure manner. In general the nutating disk 2 includes an upper surface 46 and a lower surface 48. As mentioned, the disk 2 is substantially round when considered from a top-plan view and has a central core to be described hereinafter. The disk 2 includes a perimeter edge 44 which may be specially equipped with a taper to promulgate good wiping contact along its area of juncture between the arcuate inner periphery 65 and the disk. Notice also that the perimeter edge 44 will contact the abutments 155 in a manner similar to the arcuate inner periphery 65 so that the disk 2 receives water from the inlet 60 and passes water to the outlet 70. These abutments 155 are integrally formed with the housing upper and lower portions 3, 4. As shown in FIG. 4, each disk 2 is equipped with a raidally extending slot 15. The slot 15 extends from the core 32 to its perimeter edge 44. The slot 15 provides clearance for the divider plate 14 that extends between the upper and lower housing portions. Divider plate 14 is preferably formed as a separate plate bonded within a recess 14a formed into the housing. Notice the provision of beveled sides 42 where the slot 15 is formed on the nutating disk 2. These beveled sides decrease the clearance that exists between the slot 15 of the disk with the divider plate 14 to preclude the unwanted through passage of liquid.

As shown in FIG. 5, a variant of the nutating disk is shown, compared for example with FIGS. 4, 4A, etc. The nutating disk 2 is formed with a disk core 31 formed from relatively "rigid" material which has been encapsulated in a flexible polymer seal 30. Seal 30 incorporates both the beveled slot sides 42 and the feathered perimeter 44a for benefits advanced infra.

As noted in the drawings, the nutating disk 2 includes a core 32 of substantially spherical configuration. Preferably, the spherical core 32 has a hollow interior 38 provided with a lower opening 36 which faces and addresses the concave rest 52 located in the lower portion 4. As shown in FIG. 2, for example, when the nutating disk 2 is at any extreme portion of the stroke, the hollow opening 36 of the spherical core 32 is protected from access to the fluid flow by means of the concave rest 52 which serves as a socket which supports the ball of the spherical core 32, thereby precluding the substantial through passage of fluid therewithin. In this way, the nutating disk 2 can be made of extremely light weight material and therefore have a low degree of inertia for quick response in reacting to fluid flow rates to minimize drag which would interfere with the fluid flow itself.

Preferably, the spherical center 32 of the disk 2 is integrally formed therewith and has bearing-like qualities. Thus, it may be formed from internally lubricated glass and mineral reinforced liquid crystal polymer resin.

In addition, the area of juncture between the spherical core and the upper portion 3 of the housing 50 includes an upper concave annulus 56 which serves as a bearing seat for the top portion of the spherical core 32. The close tolerance fit between the annulus 56 and the spherical core 32 renders it less likely that liquid will flow up into the tower 5 to keep it isolated from the water remaining adjacent the nutating disk 2 by means of the seal of spherical core 32 with annulus 56.

A topmost portion of the spherical core 32 includes a spindle 82 emanating therefrom axially aligned with the geometrical center of the spherical core and disk 2. The spindle 82 reacts to the fluidic conditions of water passing through the nutating disk 2 by precession within the tower 5 about the central conical bearing guide 7 which acts as a race. Because the spindle 82 is constrained to operate within the tower 5 its precession around the race 7 correlates directly with the nutation (or wobbling) of the disk 2 and provides a direct measure of the flow rate of liquid within the housing 50. In order to facilitate the precession of the spindle 82 around the race 7, and keep the disk 2 surfaces 46 and 48 firmly against the surfaces 46a and 48a during the nutating motion, a conical bearing 8 is supported on the spindle 82 and fixed thereat by means of a washer 9 overlying the conical bearing 8 and held thereto by means of a pushnut 10. The tolerance of the conical bearing 8 is such that a major cone surface of the bearing 8 abuts against the outer periphery of the race 7. A peripheral upper edge of the cone comes close to an interior wall of the tower 5.

FIG. 4A shows the spindle 82 without the conical bearing 8 in place.

FIG. 3 had shown a cover 12 adapted to overlie and seal the cylindrical perimeter wall 6 which juts up from the upper housing 3 and circumscribes the tower 5. An alternative to the cover 12 is shown in FIG. 7 where a display device is integrally formed with the nutating flow meter. The FIG. 7 version utilizes a base cover 100 similar to the FIG. 3 version, but also includes an upwardly extending rim 23 on a top surface of the cover 100 spaced inwardly from an outer periphery of the cover and defining a bead which supports an O-ring gasket 11a so that a cap 20 which houses the display instrumentation can be integrally carried on the water flow meter 1. As shown in FIG. 7, the cap 20 protects an interior 21 which houses, inter alia, a plurality of batteries 25 and a printed circuit board 26 along with a display element 27 envisioned in FIG. 6.

Note that if the FIG. 3 embodiment of the cover 12 is used, the FIG. 7 display can be at a location remote from the water meter 1 and may be wall mounted by means of a plate 22 (FIG. 8) having a step lip 22a which coacts with the segmented L-shaped lip 104 of the cover 100 for affixing thereto. The plate 22 can be screwed onto a wall and the FIG. 7 device turned and locked thereon.

Figure 7:
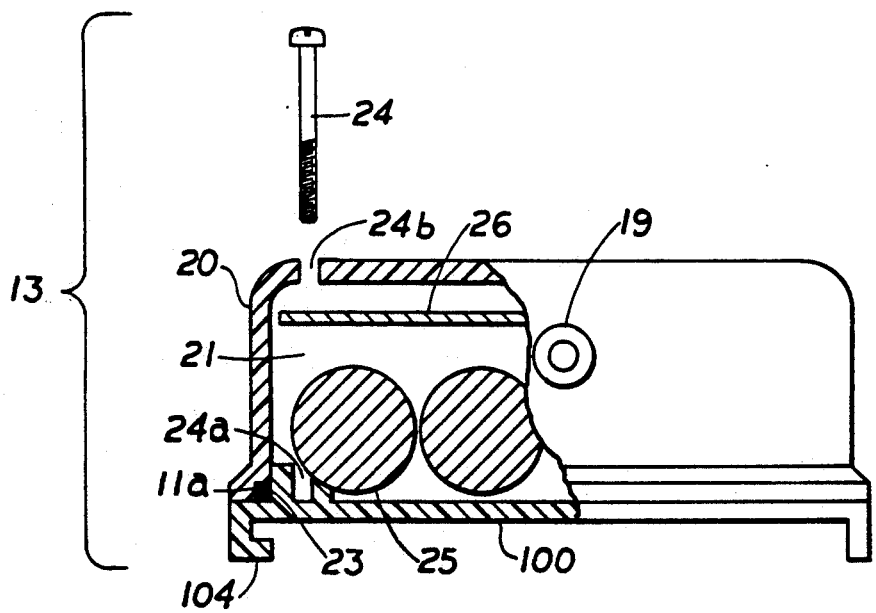
FIG. 7 is a partially fragmented sectional view of that which is shown in FIG. 6.
Figure 8:
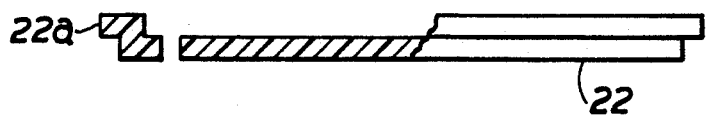
FIG. 8 is a partially fragmented sectional view of an accessory wall mount for the display.

With respect to FIG. 6, the control and read-out 13 is provided with the following exemplary indicia to allow to the consumer greater knowledge of the volume of water being consumed. As shown in FIGS. 6 and 7, the read-out 13 includes a cap 20 which is fastened appropriately to an underlying substrate such as the cover 100 by means of screws 24 which pass through an opening 24b in the cap 20 and threadedly communicates with a bore 24a having a thread pitch complemental to the contour of the threads on the screw 24.

The display face 13 may be an LED or LCD display (FIG. 9) with appropriate enunciators to provide intuitive guidance to nonsophisticated users and to provide a substantially transparent user interface. Output from the emitter and receiver 16, 17 monitoring the precession of the spindle 82 provides output to a cable 19. This remote sensor 16, 17 delivers input to a microcontroller 203 that may be time based. This microcontroller may be provided with a crystal 202 that sets the clock rate of the microcontroller 203. This time base is used in conjunction with the microcontroller's internal counter/timer. The period given by the crystal 202 and the microcontroller is displayed in FIG. 6 and can be calculated from this internal time base in hours, days or other time increments.

The cable 19 provides input from the sensor 16, 17 which was schematically depicted hereinabove as an LED device. However, one of several techniques are conceptually utilizable according to the present invention in which the receiver and transmitter may provide an optical/infra-red beam, a magnetic field detection using a magnetic pin with a hall effect sensor, a magnetic position using a magnetic pin using a reed switch, etc.

The microcontroller contains software which controls all functions of the meter. The internal timer is used to keep track of the elapsed time and the controller's program reads the front panel switches as well as time multiplexing the front panel display. The microcontroller relies upon a low clock rate to allow the microcontroller to remain in the operative position at all times without draining the battery 205, and provides narrow pulses in order to drive the emitter 16.

Figure 9:
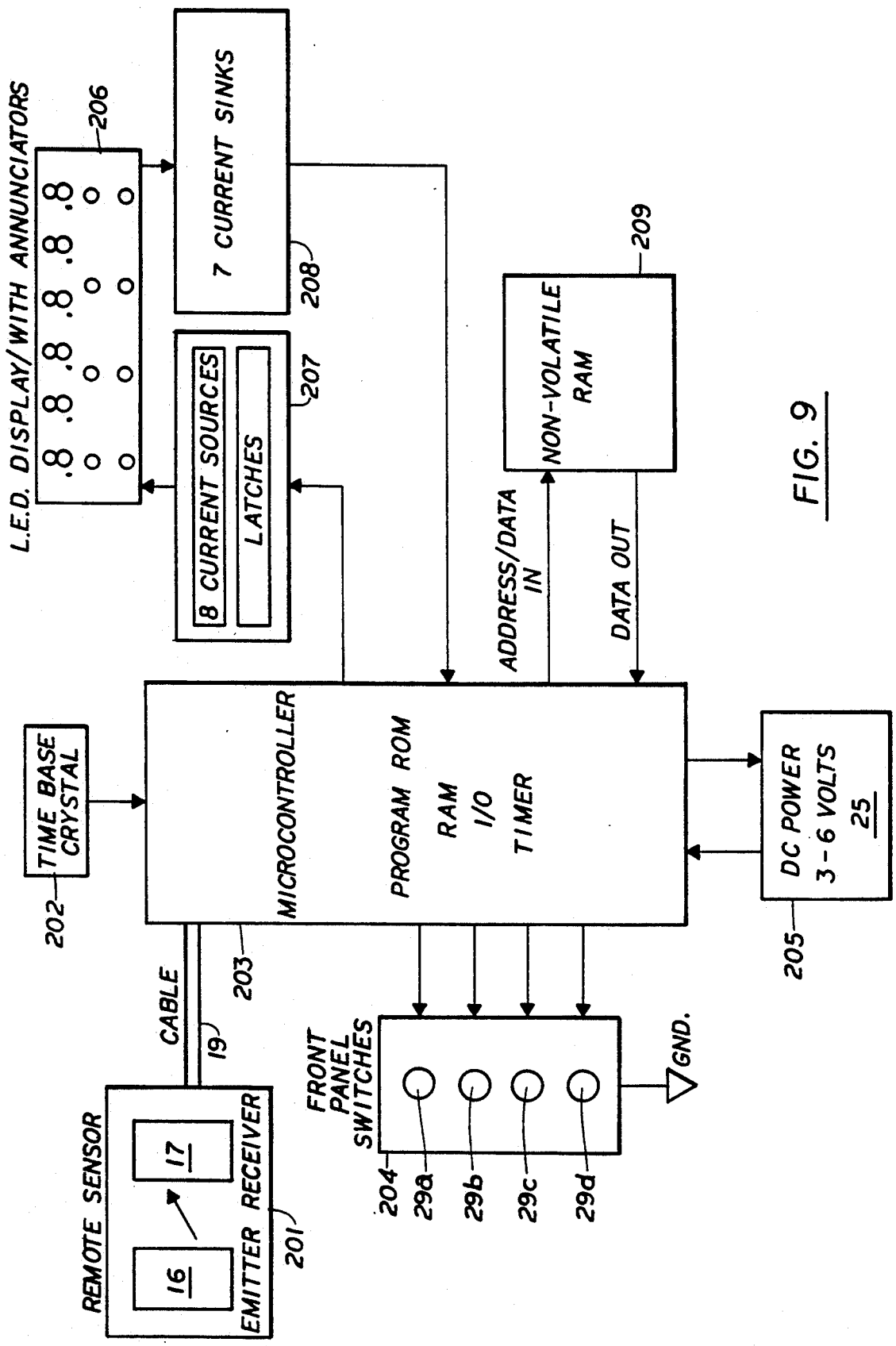
FIG. 9 is a schematic flow chart of display circuitry appropriate for the instant invention.

As shown in FIGS. 6 and 9, the front panel 13, 204 includes a plurality of switches whose functions will be briefly recounted. Switch 29a allows a user to toggle between present and past periods when monitoring the through put of water associated with the device 1, and determine the day of the period. Similarly, switch 29b allows a user to toggle between one standard form of measurement (e.g. gallons) and another standard form of measurement (e.g. units, where 1 unit=100 cubic feet). A further switch 29c can be used to start and stop monitoring during any period of time and the final switch 29d allows one to program the number of days in a period and the allocation. Should the allocation, e.g. daily, weekly, monthly, be exceeded, indica on the display panel will flash or provide another visual alarm. The display panel 27 is protected with a transparency 28 integrally formed with the cap 20 and on the display surface 13 to protect the display from contamination. In an addition to a visual alarm, an aural alarm may also be included (not shown) should an excessive amount of water be used as a function of time.

The microcontroller has an integral program rom, a ram, an input/output and an associated timer. It communicates with a nonvolatile ram 209 which saves accumulated water flow information to the limits set by the number of digits that can be stored in memory, one hundred and twenty-eight bit for example. Critical data is not lost with a low battery condition. The nonvolatile ram also saves user presets in case of power or battery failure. The nonvolatile ram loads address and inputs data serially to reduce microcontroller pin count. The data is also outputted as a serial data stream.

In addition, the microcontroller 203 communicates with the LED display by means of an interposed current source 207 and current sink 208. The current source for the display unit has the capacity of latching segments data as well as decimal point data that is needed by the display. By using a latch with the current sources, the number of input/output lines needed from the microcontroller is reduced. Because the display may be time multiplexed, the current supplied for each segment/decimal point is equal to seven times the normal segment drive current needed.

The current sinks are capable of sinking enough current to drive seven segments and a decimal point. Only one current sink is on at a time. This provides the time multiplexing mentioned hereinabove. The display 206 itself can preferably be either of a LCD or LED type. The LED type display shown in FIG. 6, uses six digits with eight annunciators. The display is time multiplexed which allows fewer driver displays to be used as well as reduces the number of input/output lines needed from the microcontroller. When the front panel switches have not been pressed from some time, the display will blank to conserve power.

An example of utilization of the switches 29 to utilize the device may follow the following paradigm. First, one programs the period in days and the allocation in gallons or units (29d). When the total, present period mode switch has been activated subsequently, the device will provide a readout of water having been used. Excessive utilization of the water will be manifested once the allotment for the period in question has been exceeded upon the pressing of any button. In order to access a grand total of water, two switches should be pressed simultaneously. The event switch 29c can be used at any time to monitor any special event such as the use of a shower or a dishwasher. The device will give an automatic display readout upon low battery condition.

Moreover, having thus described the invention, it should be apparent that numerous structural modifications and adaptions may be resorted to without departing from the scope and fair meaning of the instant invention as set forth hereinabove and as described hereinbelow by the claims.

I claim:

1. A water meter comprising in combination:
a housing formed from an upper portion and a lower portion having a divider plate integrally disposed therein,
said divider plate extending between said upper portion and said lower portion oriented adjacent walls of a water inlet and a water outlet such that water from said water inlet is diverted into said housing, and prevented from passing directly from said inlet to said outlet,
a nutating disk supported in said housing, said disk having a spherical core and elongate slot radially extending outwardly from said spherical core and straddling said divider plate,
whereby water contacts said disk causing nutation,
said spherical core supports a spindle extending perpendicularly from both said core and said disk, said spindle precessing in response to water flow,
sensing means coupled to said spindle to monitor precession of said spindle, said sensing means including said spindle formed from a non-light transmitting substance, said sensing means also including a light source and a light sensor oriented such that light from said light source is detected by said light sensor except when said spindle passes between said light source and said light sensor.
and display means coupled to said sensing means for providing an output correlative of water flow through said housing.

2. The meter of claim 1 wherein said housing is formed from said upper portion and said lower portion interconnected by means of a tongue-and-groove interconnection around an outer periphery,
said housing having an annular mid-portion circumscribing said disk except for said water inlet and water outlet, said housing having a substantially "bow-tie" shaped configuration in section,
and said housing including centrally disposed upper and lower arcuate concave recesses adapted to receive said spherical core therewithin, said core formed as a hollow body with access to said hollow body precluded by said lower arcuate concave recess.

3. The meter of claim 2, wherein said upper arcuate recess precludes the through passage of water to a tower which circumscribes said upper housing portion, said tower providing support for said sensing means and said spindle extending within said tower.

4. The meter of claim 3 wherein said spindle includes a substantially conical bearing having said conical bearing diverge outwardly away from said spherical core, said conical bearing fixed on said spindle from axial translation but capable of rotational motion on said spindle, a washer and push-nut holding said conical bearing on said spindle.

5. The meter of claim 4 wherein said conical bearing coacts against a race depending down from a top wall of said tower with said conical bearing juxtaposed tangent to said race.

6. The meter of claim 5 wherein said nutating disk includes beveled edges adjacent said housing where said disk and an inner arcuate annulus come in contact, said beveled edge formed from a resilient flexible material, such that said beveled edge of said disk maintains a seal between said disk and said inner arcuate annulus.

7. The meter of claim 6 wherein said nutating disk includes a beveled edge where said disk comes in contact with said divider plate.

8. The meter of claim 7 wherein said nutating disk is formed from a composite having a rigid central core and an outer periphery formed with a flexible polymer seal such that sealing characteristics between said disk and said housing are enhanced.

9. The meter of claim 8 wherein said tower is concentrically circumscribed by a perimeter which is substantially the same diameter as said nutating disk, said perimeter providing support for said sensing means and at a topmost portion of said perimeter a cover is positioned.

10. The meter of claim 9 wherein said cover includes a cap within which resides said display, said cap having fastening means between said cover and said periphery.

11. The meter of claim 10 wherein said display includes a microcontroller which receives output from said sensors and is initialized by a time-based crystal, and said microcontroller is controlled by a plurality of panel-switches to control past and present periods, volume of fluid used, stop and start functions and time and volume parameters, and wherein an alarm is operatively coupled to said microcontroller which is activated upon exceeding of a preset amount of water to be used.

12. The meter of claim 11 wherein said microcontroller communicates with a display and is powered by a battery and, interposed between said microcontroller and said display is a current source and current sinks;
and wherein said display is taken from a group of displays including light emitting diode (LED) type displays and liquid crystal displays (LCD).

13. The meter of claim 12 including a nonvolatile ram in operative communication with said microcontroller such that data can be transferred therebetween, and wherein said nonvolatile ram can store information related to past measurements recorded by said microcontroller for comparison to current usage.

14. The meter of claim 1 wherein said nutating disk includes beveled edges adjacent said housing where said disk and an inner arcuate annulus come in tangential registry.

15. The meter of claim 14 wherein said nutating disk includes a beveled edge where said disk comes in tangential registry with said divider plate.

16. The meter of claim 15 wherein said nutating disk is formed from a composite having a rigid central core and an outer periphery formed with a flexible polymer seal to enhance sealing characteristics.

17. The meter of claim 1 wherein said display means includes a microcontroller which receives output from said sensor means and is initialized by a time-based crystal, and said microcontroller is controlled by a plurality of panel-switches to control past and present periods, volume of fluid used, stop and start functions and time and volume parameters.

18. The meter of claim 17 wherein said microcontroller communicates with a display and is powered by means of a battery and, interposed between said microcontroller and said display is a current source and current sinks;

and wherein said display is taken from a group of displays including light emitting diode (LED) type of displays and liquid crystal displays (LCD).

19. A method for surveying the throughput of an incompressible fluid which includes routing the incompressible fluid through a meter which includes a nutating disk having a spherical central core with a hollow central portion and a slot extending radially from the spherical core on the disk and outwardly, orienting the disk within a housing so as to straddle a divider plate strategically placed within the housing in order to segment incompressible fluid flow to both an inlet branch and an outlet branch, and having a spindle which extends upwardly from the spherical core to a tower within which is supported a sensor which monitors precession of the spindle as a function of disk nutation and therefore precession of a central axis of the spherical core, providing a bearing surface on the spindle to support the spindle during its precession and a corresponding concave recess for supporting the spherical core within the housing, and connecting the sensing instrumentality to a display, and preventing passage of fluid between an outer edge of the disk and the housing by equipping the disk with a flexible beveled edge, the beveled edge being constructed to sweep against the housing without allowing fluid to pass therebetween.

* * * * *